Patented Jan. 30, 1951

2,539,491

UNITED STATES PATENT OFFICE 2,539,491

COMPOSITION FOR RUBBER COMPOUNDING

Malcolm Kent Smith, Elizabeth, N. J., assignor to The Baker Castor Oil Company, Jersey City, N. J.

No Drawing. Application September 4, 1946, Serial No. 694,821

8 Claims. (Cl. 106—254)

This invention relates to a group of oil compositions, which are particularly useful as processing aids in rubber compounding and the like.

One of the objects of this invention is to utilize oil compositions prepared from esters of the higher fatty acids, including glyceridic oils, as rubber compounding aids.

Another object of this invention is to utilize oil compositions containing zinc oxide or related finely divided solids in order to accomplish the indicated purposes.

Other objects of this invention will be apparent in the following description of the invention.

This application is a continuation-in-part of my application, Serial No. 559,485, filed October 19, 1944, and published as an abstract August 22, 1950, 637 O. G., page 125. This earlier application relates to the air-blowing of glyceridic oils and related esters and the addition of finely divided solids to such oils and esters during the blowing stage. The products obtained by the process of the earlier application are useful ingredients of rubber compositions.

A blown oil composition containing channel black to the extent of 30% by weight of the oil, such as may be prepared according to the process of my application Ser. No. 559,485, is a stiff, rubbery, and tacky mass or composition. I have found that in accordance with the present invention this rubbery composition can be plasticized effectively by the addition of a small amount of zinc oxide.

The product plasticized by zinc oxide was used as a milling aid for natural and synthetic rubbers. The results were quite surprising. It was found that the solid oil-black-zinc oxide composition described above could be added to natural rubber, or to GR-S or any of the other synthetic rubbers practically as soon as the rubbers showed any bend on the mill. The composition passed very quickly into the rubber. It could be distributed with a minimum amount of cutting, and was soon completely dispersed throughout the rubber. It was found that the rubber had received enough plasticizing during the break-down in the presence of the added oil composition to enable the remaining amount of channel black to be added practically by pouring onto the mill, and yet become readily incorporated in the rubber. Heretofore the black could be added and blended only in small increments, which is an inconvenient, time-consuming operation.

Break-down is very serious with synthetic rubbers, which are very resilient materials that resist break-down, and, when too severely milled, generally have inferior physical properties. It is therefore very important to accomplish the compounding of synthetic rubbers in minimum time as described herein, so as to obtain the most desirable physical properties.

With this invention a mixture of heat-treated oil and finely divided powder may be plasticized with zinc oxide or a related finely divided solid to produce a composition which can be readily calendered or extruded. This invention is very useful in compounding synthetic and natural rubbers. With it the period of break-down is greatly reduced thus permitting readier introduction of additional amounts of finely divided powders. The over-all milling time is reduced and the operations for the mill tender are facilitated. A composition may be hereby made so that all of the zinc oxide normally required in the rubber formulation, enough of the heat-treated oil to effect plasticization and dispersion of pigments, and a moderate portion of the channel black required are provided.

When a heat-treated oil containing carbon black is mixed into a rubber on a mill, much milling is required in order to completely effectuate the compounding of the rubber composition. When zinc oxide is included in the heat-treated oil composition containing carbon black, and this composition is added to rubber on the mill, the nerve of the rubber is reduced practically instantaneously to a point at which additional ingredients of the rubber composition can be incorporated with great ease. Since the heat developed by the blending of the zinc oxide and the carbon black with the oil is all dissipated in the heat-treating kettle or in the mixing of these ingredients in a mechanical mixer, e. g., a Werner-Pfleiderer mixer, no further heat is developed when this blended oil composition is added to the rubber on a mill.

Completely cold-processed rubbers are manufactured with complete elimination of the heat deterioration due to prolonged compounding on the mill. This is particularly important since the heat generated in the compounding of rubbers frequently is sufficient to cause degradation of the important physical properties of the rubbers. The over-all decrease in time required for compounding of rubbers when the compositions of this invention are used amounts to upwards of 50%.

When the oil or ester used in preparing the heat-treated oil compositions of this invention has been processed to an appreciable degree of polymerization, the resulting oil-black-zinc oxide composition is vulcanizable. The composition can be compounded and vulcanized using standard rubber techniques and the product is a moderately flexible elastomer. Typical physical properties are: 300 p. s. i. tensile strength; 30% elongation; and durometer hardness of 85. It is not very useful by itself, but this property of vulcanizability is of considerable value when the oil-black-zinc oxide composition is in combination with synthetic rubbers, resins, asphalts, etc.

High polymers other than rubbers are improved by the incorporation therein of the compositions of this invention. Thus, resins, such as polyvinyl chloride, rosin-type resins, indene and coumarone-indene resins, and the like may be treated with such heat-treated oil compositions to form materials useful, for example, in such applications as the production of floor tiles, linoleum, caulking compounds.

The oils which are suitable for use in the preparation of the compositions of this invention are the vegetable oils, such as castor oil, soyabean oil, and linseed oil, and also fish oils, animal oils and oils derived from petroleum. In addition to the naturally occurring oils, oils formed by the esterification of the fatty acids present in the foregoing oils, or synthetic fatty acids of similar chain lengths to the naturally occurring fatty acids, with polyhydric alcohols other than glycerine may be used in forming the compositions of this invention with excellent results. Suitable polyhydric alcohols for the indicated esterification reactions are mannitol, sorbitol, pentaerythritol, trimethylolpropane, and the like.

The compositions of this invention, which comprise intimate mixtures of heat-treated oils and finely divided solids, may be prepared by any desired method. The solids may be mixed into the oil after the polymerizing or gelling of the latter is complete, or they may be incorporated in the oil prior to heat treatment of the oil, or at any stage during the heat treatment of the oil. The mixing of a suitable solid into a partially polymerized or solid oil may be accomplished by the use of mechanical mixers. It is preferably, however, to distribute the solids in the oil during the heat treatment of the latter, as, in this way, a more homogeneous dispersion of the solid in the oil is obtained.

The preferred process for the production of the compositions of this invention involves the heat-treatment of the indicated oils and esters at a temperature in the range from about 85° to about 300° C. The heat treatment may be carried out in the substantial absence of oxygen, in which case polymerized oils are obtained. Also, the heat-treated oils may be prepared by first polymerizing and then oxidizing the starting oils or esters, or by the simultaneous polymerization and oxidation of the starting materials. The preparation of the heat-treated oils can be speeded up by the incorporation of a catalyst. Thus, when the oils are being oxidized, catalysts such as peroxides, e. g. benzoyl peroxide, may desirably be added to the oil. Such added peroxides promote the catalytic effectiveness of the peroxides which are naturally formed in the oils during the oxidation reaction.

At a desirable stage in the heat treatment of the oils and esters, a finely divided solid having wetting properties in the same range as those of zinc oxide is distributed in the oils or esters. Zinc oxide itself is a particularly suitable additive since, in addition to its effectiveness in the process and composition of this invention, it is customarily utilized in rubber compounds. Other solids which are in the same category as zinc oxide are: dry white lead, basic lead sulfate, Asbestine X (325 mesh magnesium silicate), dry red lead, black manganese oxide, Red Star Timinox ($Sb_2O_3$), Cryptone BA-19 (50% ZnS; 50% $BaSO_4$), and antimony oxide.

The details of the oil-absorption test by means of which finely divided solids may be chosen for use in the compositions of this invention are as follows: 20 grams of a finely divided solid are titrated with an oil until the solid-oil mass can be spread or will flow. It was found that, when using a dehydrated castor oil having a G-H viscosity (Gardner-Holdt Scale), finely divided solids could be rated as having oil-absorption properties in the same range as those of zinc oxide when 10 cc. or less of oil was required for the 20 gram sample of said solids.

In order to produce heat-treated oil compositions having the maximum effectiveness for the purposes of this invention, another finely divided solid, such as carbon black, silicates, and slate flour, is preferably added to the oil or ester, either during the heat treatment thereof or subsequently. This second finely divided solid may suitably be a pigment. Both types of solids may be added to the oil or ester in amounts from about 2% to about 25% by weight, based on the oil or ester.

It has been found that, in general, the time during the heat treatment when the modifying agent is to be introduced is not critical with respect to the characteristics of the finished composition. However, for production efficiency, it is often desirable to introduce a finely divided solid at a somewhat advanced stage of the heat treatment so that the oil or ester will have an increased viscosity and, thereby, some supporting effect for said solids, thus minimizing sedimentation. Furthermore, considerable depolymerization occurs if some of the finely divided powders, zinc oxide in particular, are added during the earlier stages of the heat treatment; thus, the process is lengthened when the solid addend is introduced too soon. It is particularly desirable for the final heat-treated oil to contain the finely divided solids in the form of a substantially homogeneous suspension. Heat-treated oils containing finely divided solids in substantially uniform suspension are more useful in rubber compounding because the actual compounding of the rubber proceeds more smoothly and the final rubber composition has more uniform properties.

In general, it is preferred to continue the heat-treatment of the indicated oils and esters until solid oils are formed. However, compositions which are quite satisfactory for use in rubber compounding are obtained when the heat-treating is stopped short of solid oil formation. The more useful compositions are those obtained when the final viscosity of the heat-treated oil is greater than 400 seconds Engler at 100° C., as such heat-treated oil-black-zinc oxide compositions can be calendered or extruded. The exact final oil viscosity needed, in the range from the lower limit indicated to solid oils, depends upon the particular use for which the composition is intended.

Examples of finely divided solids to be used, other than zinc oxide and compounds related there to, are carbon blacks, such as channel black, calcium carbonate, the particles of which may be coated with, for example, from 1–3% of stearic acid, and McNamee clay.

When oxygen is not used, the heat treatment may be carried out in the presence of an inert gas, such as nitrogen or carbon dioxide, or the system may be evacuated. When oxygen is used during the heat treatment, it may either be present in the reactor over the oil or ester or it is preferably passed through the oil or ester. The oxygen may be present during all or a portion of the heat treating period, the specific properties of the final gelled oil being different and dependent on the actual procedural steps used.

The oils and esters utilized in the production of the compositions of this invention may vary in their degree of unsaturation. Thus, they may be semi-drying or drying oils, the iodine number of which ranges upward from about 80.

When the preferred method of forming the heat-treated oil compositions containing finely divided solids is used and not all of the finely divided solids desired in the final heat-treated oil compositions can be incorporated during the heat treating operation, additional amounts of the finely divided solids are mixed into the oils following the heat treatment. The mixing may be effected in various types of mixers, for example, in dough-type mixers, heavy-duty mixers having sigma-type blades, or Banbury mixers. In this way, or by the method of mixing all of the finely divided solids into an oil following its heat treatment, compositions containing up to 100% by weight, based on the ester or oil, of zinc oxide and related solids, and up to 100% by weight, based on the oil or ester, of carbon black and related pigments, can be prepared. These ingredients are all mixed into the heat-treated oil in the total quantities necessary before they are added to a synthetic or natural rubber. In this way the amount of time that the rubber has to be processed on a mill during its compounding is decreased and the deteriorating effect of such milling is minimized.

The following are given as illustrative examples of the invention:

*Example 1.*—100 parts of castor oil are heated to 132° C. and blown with air until the viscosity of the oil increases to 1300 seconds Engler at 100° C. Then, 15 parts of channel black (Continental Carbon Company's grade D) and 5 parts of zinc oxide are stirred into the thickened oil and the blowing is continued for about 10 hours with the mixture at 105° C. This composition is then placed in a Banbury mixer, and to it are added 85 parts of channel black and 95 parts of zinc oxide, the whole being thoroughly mixed. The resulting composition can be easily extruded through orifices or calendered on mills. The final composition, when added to GR-S or other natural or synthetic rubbers on a mill, quickly becomes thoroughly mixed with the rubber. Such rubber may then be readily blended with further compounding ingredients, and subjected to the usual processing steps. The final cured rubber compound has outstanding over-all physical properties. When 15 parts of the indicated final composition of this example are mixed with 100 parts of rubber, the resulting rubber blend contains all of the zinc oxide usually present in rubber compounds, a portion of the black required, and sufficient blown oil to be effective as a dispersion and milling aid, but not enough to have more than a minor effect as a plasticizer.

*Example 2.*—100 parts of soyabean oil are heated to 140° C. and blown with air until the viscosity of the oil increases to 3600 seconds Engler at 100° C. At the start of the blow, 1.5 parts of benzoyl peroxide are added to the oil as an oxidation catalyst. After the indicated viscosity increase, 15 parts of Darco and 20 parts of zinc oxide are stirred into the oil, and the air blowing is continued with the mixture at 110° C. for an additional 6 hours, the oil then being in a solid, gelled condition. The product is jet-black in color and has a fine, smooth texture. It can be incorporated with natural or synthetic rubbers with similar advantageous results to those obtained with the products of Example 1.

*Example 3.*—100 parts of linseed oil are heat bodied using techniques normal to the vegetable oil industry. Soon after the oil starts to show an increase in body, 20 parts of channel black and 2.5 parts of zinc oxide are added to the oil. The agitation is sufficient to maintain the modifying agents in suspension and heating is continued until a very high viscosity is reached. The hot mixture is then dropped into containers where it finally reaches a solid, gelled condition.

This solid, modified linseed oil is then placed in a Banbury mixer. To the oil are added 80 parts of channel black and 47.5 parts of zinc oxide, and the whole is thoroughly mixed together. The resulting composition is quite effective when incorporated in natural or synthetic rubber compounds.

*Example 4.*—100 parts of dehydrated castor oil are heated to 135° C. and 1.25 parts of urea peroxide are added, and the whole is blown with air until a definite viscosity increase is obtained. Then 22.5 parts of channel black and 4 parts of zinc oxide are stirred into the oil. Blowing is continued with the mixture at 105° C. until the oil reaches a solid, gelled condition. The product of this example is quite useful as a processing aid for natural and synthetic rubbers.

*Example 5.*—100 parts of sardine oil are heated to 250° C. while maintaining a nitrogen atmosphere over the oil, and agitating the latter. When the oil reaches a viscosity of Z–3 (Gardner-Holdt), the temperature is lowered to 100° C. and 17.5 parts of channel black and 5.5 parts of zinc oxide are then stirred into the oil; air blowing of the oil is started at the same time, and is continued until the composition reaches a solid, gelled condition. This product is useful for the same purposes as are those of the preceding examples.

*Example 6.*—A heat polymerized oil is formed by holding 100 parts of pentaerythritol ricinoleate under vacuum at a temperature of 295° C. When the body of the oil reaches a viscosity of Z–3 (Gardner-Holdt), 15 parts of channel black and 3 parts of zinc oxide are introduced with vigorous stirring. The agitation and the heating are continued until test samples show the oil to be approaching a gelled condition, whereupon it is dropped into drums without cooling; the retained heat completes the polymerization to a gelled condition. This product is extremely useful as a processing aid for natural and synthetic rubbers.

*Example 7.*—100 parts of the product obtained by the substantially complete esterification of diethylene glycol with tung oil acids are heated to a temperature of 128° C., and blown with air until a definite increase in viscosity is obtained. Then, 10 parts of channel black and 10 parts of zinc oxide are stirred into the partially bodied ester, and blowing is continued with air until the ester reaches a solid, gelled condition. When the composition has cooled, it is placed in a Banbury mixer, and 40 parts of channel black are mixed in. The resulting composition is then usable as a processing aid for natural and synthetic rubbers.

*Example 8.*—100 parts of castor oil are heated to 140° C. and blown with air until the viscosity of the oil increases to 3600 seconds Engler at 100° C. Then 15 parts of McNamee clay and 5 parts of zinc oxide are stirred into the oil, and blowing is continued with the mixture at 110° C. for an additional 6.5–7 hours. The final product is a solid, gelled oil useful as a processing aid for synthetic and natural rubbers.

*Example 9.*—A polymerized and oxidized oil composition is prepared by bodying dehydrated castor oil to a Z–3 viscosity, as described in Example 6. The temperature is reduced to 140° C., and a change is made from mechanical agitation to air blowing. As soon as some peroxide structure develops, 15 parts of channel black and 5 parts of dry white lead are introduced, and oxidation is continued by vigorous blowing with air until the product approaches the gelled stage. It is then dropped into containers where it assumes a solid, gelled condition. This product can be used similarly to those of the preceding examples for the modification of natural and synthetic rubber compounds.

The following are examples of the mechanical mixing of zinc oxide, pigments, and the like with heat treated oils:

*Example 10.*—800 g. of solid, blown castor oil was charged to a small Werner-Pfleiderer mixer, and into this was mixed 40 g. of zinc oxide and 800 g. of medium processing channel black. The mixer was run with cooling water in its jacket, since considerable heat was developed by the lot being mixed. In about 15 minutes the powders were all thoroughly wetted by the oil and the product was a homogeneous, dull black mass. It was somewhat plastic and when transferred to a cold rubber mill, the product sheeted cleanly off the rolls as shiny black, flexible and dry sheets.

*Example 11.*—800 g. of castor oil, blown to an Engler viscosity of 1350 seconds at 100° C., were charged to a small Werner-Pfleiderer mixer and into this were mixed 40 g. of zinc oxide and 800 g. of medium processing channel black. The further processing and the resultant product were similar to those described in Example 10.

*Example 12.*—800 g. of castor oil, blown to an Engler viscosity of 350 seconds at 100° C., were charged to a small Werner-Pfleiderer mixer and into this were mixed 40 g. of zinc oxide and 800 g. of medium processing channel black. The mixer was kept cooled and in about 15 minutes the powders were all thoroughly wetted by the oil and the product was a homogeneous, dull black mass. It was noticeably more sticky than the product of the preceding two examples and had this property to such a degree that the composition stuck strongly to the rolls when calendered and could not be sheeted off. It was found, however, that this condition merely made handling less convenient but the composition had excellent efficiency as a compounding aid in natural and synthetic rubbers.

*Example 13.*—600 g. each of solid, polymerized soyabean oil, zinc oxide, and medium processing channel black were compounded as in Example 10. This compound was processed through to the same dry, flexible and shiny black sheets as in Example 10.

*Example 14.*—100 lbs. each of solid, blown linseed oil, zinc oxide, and medium processing channel black were combined in a Werner-Pfleiderer mixer of 100 gals. working capacity. The product was a dull black rubbery mass, similar to the laboratory products. Like them, this material also could be sheeted off a rubber mill to give shiny black, slightly flexible sheets.

*Example 15.*—A white composition of the foregoing type was prepared by mixing 600 g. each of solid, blown castor oil, a calcium silicate known as Silene EF, and zinc oxide. The materials were combined readily in a small Werner-Pfleiderer mixer and were sheeted cleanly off a rubber mill giving very shiny, white sheets of moderate flexibility.

*Example 16.*—600 g. each of solid, blown castor oil, zinc oxide, and easy processing channel black were combined together with 18 g. of sulfur in a small Werner-Pfleiderer mixer. This amount of sulfur was sufficient to satisfy the vulcanization requirements of the composition when it is to be used in rubber stocks. The product did not differ in appearance from that of the product of Example 10, yielding the same dry, flexible, shiny black sheets when run off a rubber mill.

These oil-black-zinc oxide compositions can be vulcanized only when the oil component of such compositions is at an advanced degree of polymerization. In those cases, sulfur should be used in amounts of 1% to 5% by wt. of the oil, depending on the degree of vulcanization desired. It is possible to introduce the sulfur soon after the start of the heat-treating operation, or it may be mechanically mixed in at a later time.

*Example 17.*—A composition comprising 20 parts of a solid, blown castor oil, 5 parts of zinc oxide, and 20 parts of medium processing channel black was compounded with GR–S on a standard rubber mill as follows: As soon as 100 parts of GR–S started to band on the mill, 45 parts of the above composition were added. The materials blended beautifully, so that the rubber stock was quickly in condition for the addition of the remaining ingredients. 30 parts of medium processing channel black, 1.5 parts of Captax (mercaptobenzothiazole), and 2.0 parts of sulfur were then easily mixed in; it was found that this stock could be readily compounded in 21 minutes compared to a normal time of 30 minutes when the constituents were added individually. The physical properties of this stock when vulcanized at 45 lbs. steam pressure were noticeably better than those of a standard stock.

*Example 18.*—Using a composition comprising equal parts of medium processing channel black, Baker's #30 Oil (polymerized castor oil), and zinc oxide, a GR–S tire tread stock was compounded in 17 minutes. 15 parts of the above composition were added to 100 parts of GR–S stock, as soon as it banded on the mill. A homogeneous mixture was quickly formed, and it was then easy to add 45 more parts of channel black, 1.5 parts of Captax, and 2.0 parts of sulfur. This stock vulcanized to a product having superior physical properties.

*Example 19.*—A composition comprising equal parts of solid, blown dehydrated castor oil, medium processing channel black, and zinc oxide was compounded in 100 parts of Perbunan 26. As soon as the Perbunan formed a light webbing on the mill, 10 parts of the above composition were added. A very uniform composition formed immediately; then 1 part of Altax (benzothiazyl disulfide), 1 part of diphenylguanidine, and 3 parts of sulfur were introduced and easily dispersed. The composition was finished in 3 minutes whereas 12–14 minutes were heretofore required. This compound cured to a very resilient product with a Durometer hardness of 45. Tests have shown that amounts of black, as little as 5 parts per hundred of rubber, have a tremendous reinforcing effect in synthetic rubbers when introduced via the compositions of this invention.

What is claimed is:

1. A composition of matter which is particularly useful as a processing aid in rubber compounding, comprising (1) a heat-thickened ester of an aliphatic polyhydric alcohol and of an unsaturated aliphatic acid selected from the class consisting of naturally occurring fatty acids and synthetic aliphatic, mono-carboxylic acids having at least 11 carbon atoms per molecule, (2) from 2% to 100 by weight of carbon black based on the weight of said ester, and, as a plasticizer for the combination of said ester and said carbon black, (3) from 2% to 100% of finely divided zinc oxide based upon the weight of said ester said carbon black and said finely divided zinc oxide being substantially uniformly distributed in said heat-thickened ester, and being substantially undissolved therein.

2. The composition of claim 1, in which said heat-thickened ester is in a solid, gelled condition, said carbon black and said finely divided zinc oxide having been substantially uniformly distributed in said ester prior to the gelation thereof.

3. The composition of claim 1, in which said heat-thickened ester is a solid, gelled, blown ester, said carbon black and said finely divided zinc oxide having been substantially uniformly distributed therein prior to the gelation thereof.

4. The composition of claim 1, in which said heat-thickened ester is a castor oil.

5. The composition of claim 1, in which said heat-thickened ester is a castor oil, and zinc oxide and a carbon black are both substantially uniformly distributed therein.

6. The composition of claim 1, in which said heat-thickened ester is a dehydrated castor oil.

7. The composition of claim 1, in which said heat-thickened ester is soyabean oil.

8. The composition of claim 1, containing substantially equal parts by weight of heat-thickened ester, zinc oxide and a carbon black.

MALCOLM KENT SMITH.

REFERENCES CITED

The following references are of record in the file of this patent:

UNITED STATES PATENTS

| Number | Name | Date |
|---|---|---|
| 1,906,749 | Grant | May 2, 1933 |
| 1,967,043 | Snyder | July 17, 1934 |
| 2,213,944 | Auer | Sept. 10, 1940 |
| 2,244,666 | Auer | June 10, 1941 |
| 2,283,518 | Waldie | May 19, 1942 |
| 2,388,618 | Osmansky | Nov. 6, 1945 |